US006752309B1

(12) United States Patent
Parhar

(10) Patent No.: US 6,752,309 B1
(45) Date of Patent: Jun. 22, 2004

(54) WATER SOLUBLE FLUXES AND METHODS OF USING THE SAME

(75) Inventor: Amrit K. Parhar, North Ridgville, OH (US)

(73) Assignee: Oatey Co., Cleveland, OH (US)

(*) Notice: Subject to any disclaimer, the term of this patent is extended or adjusted under 35 U.S.C. 154(b) by 0 days.

(21) Appl. No.: 09/359,249

(22) Filed: Jul. 22, 1999

(51) Int. Cl.$^7$ .................. B23K 1/20; B23K 31/02; B23K 35/34
(52) U.S. Cl. .................. 228/223; 228/207; 148/23
(58) Field of Search .................. 148/23, 24–26; 228/223, 207, 214

(56) References Cited

U.S. PATENT DOCUMENTS

| | | | |
|---|---|---|---|
| 3,925,112 A | * 12/1975 | Petersen, Sr. et al. | 148/25 |
| 3,977,916 A | 8/1976 | Stayner et al. | 148/23 |
| 4,216,035 A | * 8/1980 | Bakos et al. | 148/23 |
| 4,269,870 A | 5/1981 | Boynton | 427/96 |
| 4,290,824 A | 9/1981 | Cole | 148/23 |
| 4,460,414 A | 7/1984 | Hwang | 148/23 |
| 4,478,650 A | 10/1984 | Zado | 148/23 |
| 4,657,589 A | 4/1987 | Barajas | 106/1.13 |
| 4,701,224 A | 10/1987 | Zado | 148/23 |
| 4,708,751 A | 11/1987 | Froebel et al. | 148/23 |
| 4,818,387 A | * 4/1989 | Ikeda et al. | 210/490 |
| 4,895,606 A | 1/1990 | Jafri | 148/25 |
| 4,988,395 A | * 1/1991 | Taguchi et al. | 148/24 |
| 4,994,119 A | * 2/1991 | Gutierrez et al. | 148/23 |
| 5,011,546 A | 4/1991 | Frazier et al. | 148/23 |
| 5,069,730 A | 12/1991 | Dodd et al. | 148/23 |
| 5,085,365 A | * 2/1992 | Turner | 228/223 |
| 5,141,568 A | * 8/1992 | Turner et al. | 148/24 |
| 5,145,532 A | * 9/1992 | Fukunaga et al. | 148/23 |
| 5,150,832 A | * 9/1992 | Degani et al. | 228/224 |
| 5,196,070 A | 3/1993 | Ables et al. | 148/23 |
| 5,198,038 A | * 3/1993 | Turner et al. | 148/23 |
| 5,215,602 A | * 6/1993 | Ali et al. | 148/23 |
| 5,234,508 A | * 8/1993 | Kobayashi et al. | 148/24 |
| 5,354,623 A | * 10/1994 | Hall | 428/610 |
| 5,443,659 A | * 8/1995 | Nonogaki et al. | 148/23 |
| 5,601,228 A | * 2/1997 | Fukunaga et al. | 228/180.21 |

FOREIGN PATENT DOCUMENTS

| EP | 384 627 | 2/1990 |
|---|---|---|
| EP | 483 762 | 10/1991 |

OTHER PUBLICATIONS

F.R. Moser et al; *Water–Soluble Flux for Pb/In Solder Joints and Stacked Joints*; IBM Technical Disclosure Bulletin, vol. 21, No. 3 Aug. 1978.

W.R. Lewis; *Some Further Flux Trials With Polyethylene Glycol*; TIN AND ITS USES, No. 48, Autumn 1959.

W.R. Lewis; *A New Medium For Resin Flux Polyethylene Glycol*; No. 46, Spring 1959.

Dennis F. Bernier; *The Nature of White Residue on Printed Circuit Assemblies;* Nature of white residue, pp. 1–6, Apr. 1988.

F.M. Zado; *Effects of Non–Ionic Water Soluble Flux Residues;* Proceedings of the NEPCON Conference, 1979.

D. Rocak et al; *Replacement of CFS Solvents by New"No Clean "Fluxes or New Solvents for Electronic Circuit Cleaning After Soldering;* Informacije MIDEM 25 (1995)3, str.. 209–213.

P. Amoukhteh; *Qualification of Water Soluble Fluxes for Solder Paste Application;* pp. 2103–2110.

C.J. Owen et al; *Water–Soluble Flux;* IBM Technical Disclosure Bulletin, vol. 20, No. 2, Jul. 1977.

M. Nasta et al; *A model of the Solder Flux Reaction: Reactions at the Metal/MetalOxide/Electrolyte Solution Interface;* Circuit World, vol. 21, No. 4, 1995.

T. Van der Molen; *Water Soluable Fluxes vs. Rosin Fluxes for Soft Soldering of Electronic Devices;* Insulation Circuits, pp. 32–38, May 1977.

P. Schuessier; *Water–Soluble Flux Technology;* Insulation Circuits, pp. 88–91, Dec 1981.

D.A. Dietz; *Aqueous and Water–Soluble;* Circiuts Assembly, pp. 62–64, Jun 1993.

EP 99 30 5865; European Search Report mailed Sep. 3, 2003.

*"Carbowax" Polythylene Glycols as Vehicles for Soldering Fluxes.*

W.R. Lewis; *Waterless Soldering Fluxes Using Polyethylene Glycol;* TIN ANT ITS USES, No. 51, 1961.

W.R. Lewis; *Polyethylene Glycol as a Vehicle for Acid Fluxes;* TIN AND ITS USES, No. 47, Summer 1959.

* cited by examiner

*Primary Examiner*—M. Alexandra Elve
*Assistant Examiner*—Zidia Pittman
(74) *Attorney, Agent, or Firm*—Renner, Otto, Boisselle & Sklar, LLP

(57) ABSTRACT

The present invention relates to water soluble fluxes which comprise at least one wax carrier, at least one surfactant and at least one activator. The present water soluble fluxes are easily applicable with a brush. They have excellent pull through of solder in the joint. The water soluble flux avoids turning copper green and does not burst into flame on heating with a torch.

18 Claims, No Drawings

WATER SOLUBLE FLUXES AND METHODS OF USING THE SAME

TECHNICAL FIELD OF THE INVENTION

This invention relates to water soluble fluxes and methods of making the same. The water soluble fluxes comprise, at least one wax carrier and at least one surfactant, and at least one activator.

BACKGROUND OF THE INVENTION

Fluxes are used to promote the wetting of the metal surface with molten solder. Previously, rosin based fluxes were used. These materials left residue which was removed only with the use of organic solvents. The organic solvents would evaporate and adversely affect people and the environment.

Water soluble fluxes provide the improved "fluxing" and additionally the residue of the flux can be removed by water. Water soluble fluxes provide removal of flux residue without the exposure of people and the environment to harmful volatile organic chemicals. However, water soluble fluxes have suffered from a number of drawbacks. The water soluble fluxes often give off smoke on heating, turn liquid above 100° F., are difficult to apply with a brush, fail to provide excellent pull through of the solder in the joint, promote seizing of the joint, turn copper green and/or burst into flame upon heating with a torch. It is desirable to have a water soluble flux whose residue is removable with water and which does not have the above limitations.

SUMMARY OF THE INVENTION

The present invention relates to water soluble fluxes which comprise at least one wax carrier, at least one surfactant and at least one activator. The present water soluble fluxes are easily applicable with a brush. They have excellent pull through of solder in the joint. The water soluble flux avoids turning copper green and does not burst into flame on heating with a torch.

DETAILED DESCRIPTION OF PREFERRED EMBODIMENTS

The wax carrier of the water soluble fluxes is any wax which can form a brushable paste with the surfactant and form water soluble residue as defined by above. The wax carrier is generally present in an amount up to about 10%, or up to about 9%, or up to about 8% by weight. Typically the wax carrier is present in an amount from about 1% to about 8%, or from about 2% to about 7% by weight. Here and elsewhere in the specification and claims the ratio and range limits may be combined.

The wax carrier may be any wax which has a melting point from about 55° C. to about 150° C., or from about 60° C. to about 120° C., or from about 65° C. to about 100° C., or from about 70° C. to about 90° C. The wax carrier may be any fatty carboxylic acid waxr or derivative thereof, such as polyol esters of fatty carboxylate waxes or hydroxycarboxylate waxes. The fatty carboxylic acids are those containing from about 12 to about 30, or from about 14 to about 24, or from about 16 to about 22 carbon atoms. In one embodiment, the fatty carboxylic acid is a saturated carboxylic acid. Examples of the fatty carboxylic acid include decanoic, dodecanoic, tetradecanoic, hexadecanoic, heptadecanoic, octadecanoic and docodecanoic acid. The wax carrier may contain a mixture of fatty carboxylic acids.

In one embodiment, the wax carrier is a polyol ester of fatty carboxylic acids. The polyols include those having from about two to about eight, or from about two to about four hydroxyl groups and contain from about 2 to about 12, or from about 2 to about 8, or from about 3 to about 6 carbon atoms. The polyols include alkylene (ethylene or propylene) glycols, glycerol, sorbitan, pentaerythritol, etc.

Examples of wax carriers include, but are not limited to, castor wax (melting point (MP) 87° C., MP 70, or MP 80), synthetic beeswax, Crothix (polyethylene glycol pentaerythritol tetrastearate), sorbitan tristearate, and polyethylene glycol trihydroxystearin. In one embodiment, the water soluble flux is free of gum resins, such as gum arabic, and polysaacharides.

The water soluble fluxes also contain at least one surfactant. The surfactant is generally present in an amount to form a brushable paste and solubilize the wax carrier. Typically the surfactant is present in an amount from about 25% to about 75%, or from about 30% to about 60%, or from about 35% to about 55% by weight of the water soluble flux. In one embodiment, the surfactant used in the water soluble fluxes are free of phosphorus.

The surfactants include polyoxyalkylene carboxylic acids, polyoxyalkylene carboxylic esters, polyoxyalkylene alcohols, polyoxyalkylene amines, polyalkoxylated fatty oils polyalkylene glycols or mixtures of two or more thereof. The surfactant may be used alone or in combination with other surfactants. The surfactants may be made by reaction with a polyalkylene glycol or by treating a molecule with an alkylene oxide, such as those having from about 2 to about 8, or from about 2 to about 4 carbon atoms and including ethylene oxide, propylene oxide and butylene oxide. The polyalkylene glycol may be an poly($C_{1-12}$) alkylene glycol, such as a poly-ethylene, polypropylene, polybutylene or polyhexylene glycol.

In one embodiment, the surfactant is a polyoxyalkylene carboxylic ester. The polyoxyalkylene carboxylic ester may be a polyoxyalkylene mono- or di-carboxylic ester. Typically the polyoxyalkylene carboxylic esters are derived from one or more of the above described fatty carboxylic acids such as tall oil acid, stearic acid, oleic acid, and castor oil acid (including hydrogenated castor oil). The polyoxyalkylene carboxylic esters are formed from a polyalkylene glycol having a number average molecular weight from about 100 to about 800, or from about 200 to about 600, or from about 300 to about 500. In one embodiment, the polyoxyalkylene carboxylic esters have an average of about 5 to about 20, or of about 6 to about 16, or of about 8 to about 12 oxyalkylene groups. An example of a commercially available polyoxyalkylene carboxylic ester is Calgene 40-L (a polyethylene glycol (molecular weight 400) monolaurate) available from Calgene Chemical Inc.

In another embodiment, the surfactant is a polyoxyalkylene carboxylic acid. These surfactants typically are derived from one or more of the above fatty carboxylic acids and have an average of about 5 to about 50, or of about 10 to about 40, or of about 20 to about 30 moles of one of more of the above alkylene oxides. In one embodiment, the polyoxyalkylene carboxylic acid is derived from an unsaturated fatty carboxylic acid, such as oleic acid. An example of a useful polyoxyalkylene carboxylic acid is Canasol 823 (an ethoxylated oleic acid having an average of 23 moles of ethylene oxide) available from Canamex.

In another embodiment, the surfactant may be a polyoxyalkylene alcohol. These surfactants are produced by treating an aliphatic alcohol, with an excess of one or more of the above alkylene oxides. The alcohol may be a primary or secondary alcohol, and may have from about 4 to about 30, or from about 6 to about 20, or from about 8 to about 16 carbon atoms. The alcohol may be a fatty alcohol, such as stearyl, lauryl, cetyl and oleyl alcohol. The polyoxyalkylene alcohols may be derived from a polyalkylene glycol having a molecular weight from about 2000 to about 9000, or from about 300 to about 7500, or from about 4000 to about 6000. In one embodiment, the polyoxyalkylene alcohols are derived from about 10 to about 150, or from about 30 to about 120, or from about 5 to about 90 moles of one or more of the above described alkylene oxide.

The polyoxyalkylene alcohols are generally water soluble, mono-functional surfactants. An example of commercially available polyoxyalkylene alcohols includes Pluracol® W series alkoxylated polyethers. A particularly useful polyoxyalkylene alcohol is Pluracol® W 5100. Another useful surfactant is Dethox SA-80, an ethoxylated stearyl alcohol having about 80 moles of ethylene oxide available from DeForest Enterprises, Inc.

In another embodiment, the surfactant is a polyoxyalkylene amine or a polyalkoxylated amine. These surfactants are prepared by reacting one or more of the above alkylene oxides with one or more amine. The polyoxyalkylene amines are derived from about 5 to about 100, or from about 8 to about 80, or from about 10 to about 70 moles of alkylene oxide. In one embodiment, the polyoxyalkylene amine is derived from about 5 to about 40, or from about 8 to about 30, or from about 10 to about 20 moles of alkylene oxide. In another embodiment, the polyoxyalkylene amine is derived from about 20 to about 100, or from about 30 to about 80, or from about 40 to about 60 moles of alkylene oxide. The amines used to prepare these surfactants are primary or secondary mono- or poly- amine having from about 3 to about 50, or from about 6 to about 30, or from about 8 to about 24 carbon atoms. These amines may be fatty amines. The amine may be obtained by the hydrolysis of fatty oils such as tallow oils, sperm oils, coconut oils, etc. Specific examples of fatty acid amines containing from about 8 to about 30 carbon atoms include saturated as well as unsaturated aliphatic amines such as octyl amine, decyl amine, lauryl amine, stearyl amine, oleyl amine, myristyl amine, palmityl amine, dodecyl amine, and octadecyl amine.

Examples of commercially available polyoxyalkylene amines include the Ethomeen polyalkoxylated amines of Akzo Nobel, and Jeffamines® available from Huntsman Chemical. Specific examples of useful polyoxyalkylene amines include Ethomeen® 18/60, an ethoxylated stearylamine having an average of 50 moles of ethylene oxide, and Ethomeen RS/25, an ethoxylated soy alkyl amine having an average of about 15 moles of ethylene oxide.

In another embodiment, the surfactant is a polyalkylene glycol. The polyalkylene glycol may be formed from any of the above described alkylene oxides and include polyethylene glycol, polypropylene glycol and polybutylene glycol. In one embodiment, the polyalkylene glycols have a molecular weight from about 100 to about 2000, or from about 200 to about 1500, or from about 300 to about 1000.

A particularly useful polyalkylene glycol is polyethylene glycol having an average molecular weight of 540.

In another embodiment, the surfactant may be an alkoxylated fatty oil. The oils include oils having from about 8 to about 30 carbon atoms and include those from animals and vegetables. The oils include castor oil, lard oil, tall oil, peanut oil, soybean oil, cottonseed oil, sunflower seed oil, rapeseed oil, and wheat germ oil. These oils generally have an average of about 5 to about 80, or of about 10 to about 70, or of about 20 to about 50 oxyalkylene groups. An example of these surfactants is Depeg 30-CO, an ethoxylated castor oil having an average of 30 moles of ethylene oxide, available from DeForest Enterprises, Inc.

The water soluble fluxes also contain at least one activator. The activator is present in an amount sufficient to reduce the base metal oxides and allow solder to flow in the joint. Typically the activator is present in a total amount from about 0.5% to about 20%, or from about 1% to about 15%, or from about 2% to about 10%. The activators may be acids and metallic or amine salts, such as salicylic acid, glutamic acid, glutamic acid hydrochloride, betaine hydrochloride, zinc chloride, ammonium chloride, hydroxyamine salts. In one embodiment, from about 0.5% to about 5%, or from about 1% to about 4%, or from about 2% to about 3% zinc chloride and from about 0.1% to about 2%, or from about 0.2% to about 1%, or from about 0.3% to about 0.5% by weight of ammonium chloride are present in the water soluble flux.

The hydroxyamine salts are typically salts of alkanolamines, such as mono-, di- or tri- alkanolamines. The alkanolamines may have alkyl and hydroxyalkyl groups. Each of these group independently contain from about 1 to about 12, or from about 2 to about 8 carbon atoms. Typically the groups are ethyl, propyl, butyl, amyl, hexyl, 2-ethylhexyl, octyl groups or hydroxyalkyl versions thereof. Examples of useful activators include hydrochloride salts of monoethanolamine, diethanolamine, triethanolamine, ethyl, ethanolamine, and methyl, ethanolamine.

In another embodiment, the activator is a betaine hydrochloride. The betaine hydrochloride may be present in an amount from about 0.3% up to about 10%, or from about 0.5% up to about 7%, from about 0.75% up to about 5%.

The water soluble fluxes are generally in the form of a paste. The water is present at a level sufficient to form the paste. Typically, water is present in an amount from about 5% to about 28%, or from about 8% to about 25%, or from about 10% to about 20% by weight.

The water soluble fluxes are prepared by mixing the ingredients under blending conditions at a temperature of about 190° F. to about 250° F., or from about 200° F. to about 220° F. The water soluble fluxes must be useful to join copper surfaces on ½ to 4 inch diameter copper pipes with a solder alloy. The solder alloy may be any solder alloy. Solder alloys may be any of those known to the art such as those containing tin, lead, antimony, silver, zinc and the like. Examples of useful solders include tin/lead solders, including a 60/40 tin/lead solder and 40/60 tin/lead solder, tin antimony solder, such as 95/5 tin/antimony solder, tin silver solder, such as 95/5 tin/silver solder; lead silver tin solders, such as 94.5/5.5 lead/silver solder and 97.511.5/1 lead/silver/tin solder; tin/zinc solder such as 91/9 tin/zinc solder and 70/30 tin/zinc solder; and lead/tin/antimony solders, such as 97/20/1 lead/tin/antimony. Specific examples of useful solders include 96 part Sn, 3 part Cu, 1 part Bi and 0.1 Ag; or 95 part Sn and 5 part Sb.

In one embodiment, a tinning flux is used. The tinning flux is prepared by adding solder alloy to a flux. The solder alloy is generally present in an amount from about 1% to about 15%, or from about 2% to about 12%, or from about 3% to about 10% by weight. The solder alloy may be any of those known to the art. In one embodiment, the alloy is one of those described above. In another embodiment, the alloy includes from about 0.05% to about 1%, or from 0.08% to about 0.5% or about 0.1% by weight silver. In another embodiment, from about 0.05 to about 1, or from about 0.08 to about 0.5, or about 0.1 parts of silver is added to the above alloys.

In one embodiment, the water soluble fluxes of the present invention are free of alkali metal hydroxides such as sodium or potassium hydroxide. In another embodiment, the solder alloy used in the water soluble fluxes is free of gold.

The following examples provide illustrative water soluble fluxes. The amounts are in parts by weight.

TABLE II

| INGREDIENTS | I | II | III | IV | V | VI | VII |
|---|---|---|---|---|---|---|---|
| Castor Wax | 6 | 5 | 6 | 6 | 5 | 6 | 3 |
| polyethylene glycol Monolaurate | 65 | 45 | — | 26 | 30 | 26 | 30 |
| polyethylene glycol Tallowamine | — | 20 | — | — | 2 | — | 2 |
| polyethylene glycol Polyether | — | — | 25 | 10 | 22 | 10 | 10 |
| Castor Oil Ethoxylate | — | — | 45 | 10 | 9 | 10 | 10 |
| Salicyclic Acid | — | — | — | — | 8 | — | — |
| Ethoxylated Stearylamine | — | — | — | 8 | 10 | 8 | — |
| Ethoxylated Soy Alkylamine | — | — | — | — | 9 | — | — |
| Zinc Chloride | — | 3 | — | — | 3 | 3 | 3 |
| Ammonium Chloride | — | 0.5 | — | — | 0.4 | 0.4 | 0.5 |
| Ethoxylated Stearyl Alcohol | — | — | 4 | 4 | 1 | 4 | — |
| Triethanolamine Hydrochloride | 10 | — | 8 | 8 | — | 8 | 10 |
| Betaine Hydrochloride | — | — | — | — | — | — | 1 |
| Stearic Acid | — | 3 | — | 6 | — | 6 | 5 |
| Water | 19 | 23.5 | 12 | 10 | 1 | 19 | 20 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A water-soluble flux comprising (A) castor wax, (B) at least one surfactant, and (C) at least one activator, wherein the flux is rosin-free.

2. The composition of claim 1 wherein castor wax is present in an amount from about 1% to about 8% by weight.

3. The composition of claim 1 wherein the surfactant (B) comprises polyoxyalkylene carboxylic acids, polyoxyalkylene carboxylic esters, polyoxyalkylene alcohols, polyoxyalkylene amines, polyalkylene glycol, alkoxylated fatty oils and mixtures of two or more thereof.

4. The composition of claim 1 wherein the activator (C) is selected from a salicylic acid, betaine hydrochloride, glutamic acid, glutamic acid hydrochloride, zinc chloride, ammonium chloride, and a hydroxyamine salt.

5. A water-soluble flux comprising (A) castor wax, (B) at least one surfactant, (C) at least one activator and water.

6. The composition of claim 5 wherein the surfactant (B) comprises polyoxyalkylene carboxylic acids, polyoxyalkylene carboxylic esters, polyoxyalkylene alcohols, polyoxyalkylene amines, polyalkylene glycol, alkoxylated fatty oils and mixtures of two or more thereof.

7. The composition of claim 5 wherein the activator (C) is selected from a salicylic acid, betaine hydrochloride, glutamic acid, glutamic acid hydrochloride, zinc chloride, ammonium chloride, and a hydroxyamine salt.

8. A water-soluble flux composition comprising:
   (A) a wax carrier having a melting point from about 70° C. to about 150° C.,
   (B) at least one surfactant, and
   (C) at least one activator,
   wherein the flux is rosin-free.

9. The composition of claim 8 wherein the wax carrier is a fatty carboxylic acid wax or derivative thereof.

10. The composition of claim 8 wherein the wax is selected from castor wax, synthetic bees wax, polyethylene glycol pentaerythritol tetrastearate, sorbitan tristearate, and polyethylene glycol trihydroxystearin.

11. The composition of claim 8 wherein the wax carrier (A) is present in an amount up to 10%.

12. The composition of claim 8 wherein the surfactant (B) comprises polyoxyalkylene carboxylic acids, polyoxyalkylene carboxylic esters, polyoxyalkylene alcohols, polyoxyalkylene amines, polyalkylene glycol, alkoxylated fatty oils and mixtures of two or more thereof.

13. The composition of claim 8 wherein the activator (C) is present in an amount from about 0.5% to about 20%.

14. The composition of claim 8 wherein the activator (C) is selected from a salicylic acid, betaine hydrochloride, glutamic acid, glutamic acid hydrochloride, zinc chloride, ammonium chloride, and a hydroxy amine salt.

15. The composition of claim 8 wherein the activator is a hydrochloride salt of an alkanol amine.

16. The composition of claim 8 further comprising water.

17. The composition of claim 16 wherein the water is present in an amount from about 5% to about 28%.

18. A water-soluble flux composition comprising:
   (A) a wax carrier having a melting point from about 70° C. to about 150° C.,
   (B) at least one surfactant, and
   (C) at least one activator,
      wherein the surfactant (B) comprises polyoxyalkylene carboxylic acids, polyoxyalkylene carboxylic esters, polyoxyalkylene alcohols, polyoxyalkylene amines, polyalkylene glycol, alkoxylated fatty oils and mixtures of two or more thereof;
      the activator (C) is selected from a salicylic acid, betaine hydrochloride, glutamic acid, glutamic acid hydrochloride, zinc chloride, ammonium chloride, and a hydroxyamine salt, and
      the flux is rosin-free.

* * * * *